United States Patent
Knox

(10) Patent No.: US 10,961,974 B2
(45) Date of Patent: Mar. 30, 2021

(54) TIDAL POWER GENERATION SYSTEM AND METHODS

(71) Applicant: 1847 Subsea Engineering Limited, Aberdeen (GB)

(72) Inventor: Richard Knox, Aberdeen (GB)

(73) Assignee: 1847 SUBSEA ENGINEERING LIMITED, Aberdeen (GB)

( * ) Notice: Subject to any disclaimer, the term of this patent is extended or adjusted under 35 U.S.C. 154(b) by 198 days.

(21) Appl. No.: 14/787,842

(22) PCT Filed: May 9, 2014

(86) PCT No.: PCT/GB2014/051435
§ 371 (c)(1),
(2) Date: Oct. 29, 2015

(87) PCT Pub. No.: WO2017/181130
PCT Pub. Date: Nov. 13, 2014

(65) Prior Publication Data
US 2016/0115936 A1    Apr. 28, 2016

(30) Foreign Application Priority Data
May 10, 2013 (GB) .............................. GB1308462.9

(51) Int. Cl.
*F03B 13/26* (2006.01)
*F03B 3/12* (2006.01)
(Continued)

(52) U.S. Cl.
CPC ................ *F03B 3/128* (2013.01); *F03B 3/18* (2013.01); *F03B 11/008* (2013.01); *F03B 13/10* (2013.01);
(Continued)

(58) Field of Classification Search
CPC ......... F03B 3/128; F03B 3/18; F03B 11/008; F03B 13/10; F03B 13/264; F03B 15/08;
(Continued)

(56) References Cited

U.S. PATENT DOCUMENTS 7,470,086 B2    12/2008   Jennings et al.
7,902,687 B2    3/2011    Sauer et al.
(Continued)

FOREIGN PATENT DOCUMENTS

FR    2949826      3/2011
GB    2489810      10/2012
(Continued)

OTHER PUBLICATIONS

International Search Report and Written Opinion for PCT/GB2014/051435 dated Dec. 4, 2014.

*Primary Examiner* — Justin D Seabe
(74) *Attorney, Agent, or Firm* — Workman Nydegger

(57) ABSTRACT

The invention provides a system for the extraction of energy from an underwaterflow stream in a body of water. The system comprises a support frame which comprises a plurality of receptacles for mounting functional modules on the support frame. The plurality of receptacles are arranged to form a horizontally-distributed two-dimensional array on the support frame. The plurality of vertical axis turbine units is configured to be interchangeably mounted in the receptacles.

32 Claims, 7 Drawing Sheets

(51) Int. Cl.
*F03B 17/06* (2006.01)
*F03B 13/10* (2006.01)
*F03B 3/18* (2006.01)
*F03B 11/00* (2006.01)
*F03B 15/08* (2006.01)
*F03B 15/18* (2006.01)

(52) U.S. Cl.
CPC ............ *F03B 13/264* (2013.01); *F03B 15/08* (2013.01); *F03B 15/18* (2013.01); *F03B 17/062* (2013.01); *F05B 2240/40* (2013.01); *F05B 2240/97* (2013.01); *Y02E 10/20* (2013.01)

(58) Field of Classification Search
CPC .... F03B 15/18; F03B 17/062; F05B 2240/40; F05B 2240/97; Y02E 10/28
See application file for complete search history.

(56) References Cited

U.S. PATENT DOCUMENTS

| | | | |
|---|---|---|---|
| 8,222,761 | B2 | 7/2012 | Park |
| 2009/0134623 | A1 | 5/2009 | Krouse |
| 2011/0031753 | A1* | 2/2011 | Moore ................... F03B 17/063 290/54 |
| 2011/0084490 | A1 | 4/2011 | Knox |
| 2012/0082530 | A1 | 4/2012 | Achard et al. |
| 2012/0189448 | A1* | 7/2012 | Jaquier ................. F03B 13/264 416/124 |
| 2013/0099499 | A1* | 4/2013 | Levin ..................... F03B 13/10 290/52 |
| 2014/0023441 | A1* | 1/2014 | Smith ..................... F03B 11/00 405/224 |
| 2014/0138973 | A1* | 5/2014 | Blaxland ................... B66C 1/10 294/215 |

FOREIGN PATENT DOCUMENTS

| | | |
|---|---|---|
| GB | 2490737 | 11/2012 |
| GB | 2495439 | 4/2013 |
| WO | WO200028210 | 5/2000 |
| WO | WO2010-064770 | 6/2010 |
| WO | WO2010/150248 | 12/2010 |
| WO | WO20120150248 | 12/2010 |
| WO | WO2012/087064 | 8/2012 |
| WO | WO2013/019117 | 2/2013 |
| WO | WO2013019117 | 2/2013 |

* cited by examiner

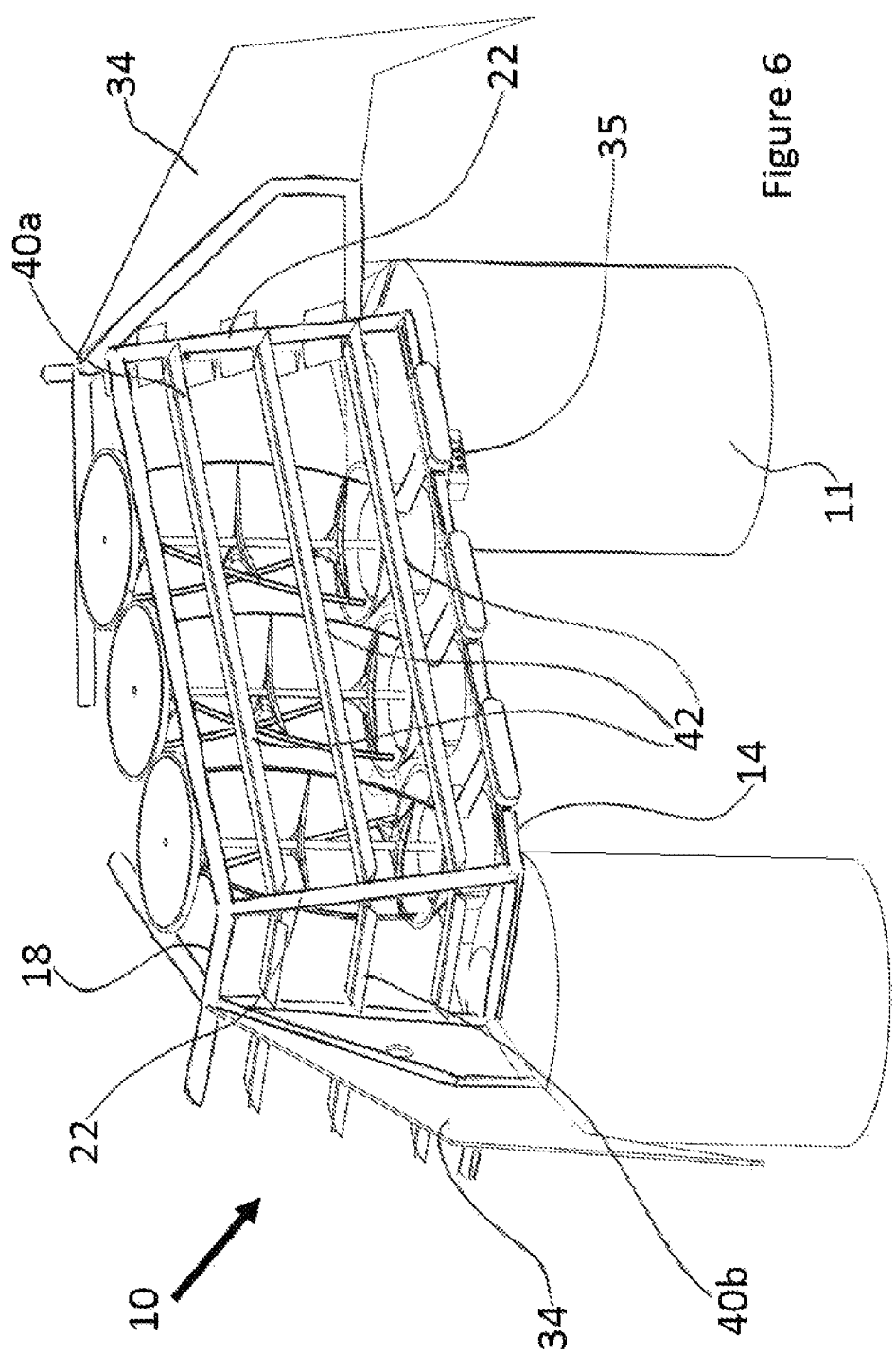

TIDAL POWER GENERATION SYSTEM AND METHODS

CROSS-REFERENCE TO RELATED APPLICATIONS

This application claims priority to and the benefit of PCT Application No. PCT/GB2014/051435, filed May 9, 2014, entitled "TIDAL POWER GENERATION SYSTEM AND METHODS", which claims the benefit of and priority to Great Britain Patent Application No. 1308462.9, filed May 10, 2013, each of which is incorporated herein in its entirety.

The present invention relates to a system for power generation and methods of use, and in particular to a power generation system for conversion of tidal kinetic energy into electricity or other forms of energy or energy storage. The invention has particular, although not exclusive, application to low velocity tidal streams.

BACKGROUND TO THE INVENTION

Renewable energy sources are predicted to play an ever increasing role in the future due to the need to cut down greenhouse gas emissions and reduce the current high dependency on fossil fuels, which are unevenly distributed around the world.

Among the different sources of renewable energy, solar and eolic energy are currently widely exploited in countries such as Spain, US or Germany. However, tidal energy is perhaps one of the most underexploited forms and, although there is currently some commercial exploitation of tidal energy, most of the related technology is still in its development phase, with new improvements continuously seeing their way to practical application. Many countries have coastlines which are rich in low velocity tidal stream locations, giving potential to increase tidal energy utilisation and alleviating dependency on fossil fuels.

U.S. Pat. No. 7,902,687 B2 describes a power generation system based on a plurality of horizontal axis turbines. Each turbine is supported in a structural frame which can rest on the seafloor or moored beneath the surface by tether on the seafloor. The system of U.S. Pat. No. 7,902,687 is highly directional, and slight deviation of the stream from an essentially frontal direction would result in a considerable reduction of the energy output in the system.

U.S. Pat. No. 7,470,086 B2 describes a subsea power generation system comprising several horizontal turbines arranged in a common structural support. The whole assembly is positively buoyant and is located at an intermediate distance between the ocean floor and the surface. The system is held in place by mooring lines attached to the corners of the assembly. An associated problem with the system of U.S. Pat. No. 7,470,086 B2 is that the mooring lines can be easily entangled with equipment used by many ships such as fishing trawlers.

In U.S. 2011/0084490 there is proposed a vertical turbine system for generating electricity from the force of deep ocean currents. This turbine system can be supported on abandoned oilwell structural foundations, after suitable modifications, thus reducing some of the cost of deploying subsea turbines on the seabed. However, the system of U.S. 2011/0084490 can only be utilised in locations of existing oilfields, or requires the instatement of an oilwell style foundation reducing the economical and logistical benefits of the system.

U.S. Pat. No. 8,222,761 B2 describes a subsea power generating system which can be located on the seafloor and comprises a linear array of vertical turbines aligned and supported in a frame which protects the turbines against debris in the tidal flowstream. The system of U.S. Pat. No. 8,222,761 is relatively difficult to deploy and install due to the structure of the support frame. Furthermore, maintenance or repair of the turbines would be a complicated operation.

WO 00/28210 describes a tidal or hydraulic power generation system consisting of one or more turbines located in a shroud which defines a constriction. The turbines are located at the constriction where the transversal area is at its minimum and the fluid flow reaches maximum speed. Whereas this concept allows a suitable protection of the turbines against floating objects or fishing equipment and an improved energy output can be achieved, the maintenance, repair or replacement of these turbines difficult as the shroud does not facilitate easy access to the turbine unit.

There is generally a need for a tidal power generation apparatus and method of use which addresses one or more of the problems associated with conventional systems, including those identified above.

It is amongst the aims and objects of the invention to provide a method and/or apparatus for tidal power generation that allows easy deployment and maintenance, that is suitably protected against matter entrained by the tidal streams or against fishing equipment, that can economically generate energy in low speed tidal streams locations, where stream direction experiments continuous shifts and/or which obviates or mitigates one or more drawbacks or disadvantages of the prior art.

In particular, one aim of an aspect of the invention is to provide a method and/or apparatus which may be configured or optimised to generate a high energy output in low tidal stream speed locations, so that tidal energy can be generated closer to the points of final use and thus reducing capital and operational expenditure.

SUMMARY OF THE INVENTION

According to a first aspect of the invention, there is provided a system for the extraction of energy from an underwater flow stream in a body of water, the system comprising:
a support frame comprising a plurality of receptacles for mounting functional modules on the support frame, the plurality of receptacles arranged to form a horizontally-distributed two-dimensional array on the support frame; and
a plurality of vertical axis turbine units configured to be interchangeably mounted in the receptacles.

Preferably the system may comprise at least one functional module configured to be interchangeably mounted in the receptacles.

Preferably the plurality of vertical axis turbine units may be arranged substantially in a horizontal plane.

The plurality of vertical axis turbines may be arranged with a subset of the vertical axis turbines vertically offset with respect to others of the plurality of vertical axis turbines.

The one or more receptacles may comprise functional modules selected from the group of an energy storage module, an accumulator cell module, a hydrogen fuel cell module or a control module.

The support frame and plurality of vertical axis turbines units may form an integrated assembly configured to be towed to an installation and/or lowered to the bed of the body of water.

Preferably, each of the turbine unit may comprise a turbine shaft. More preferably each of the turbine unit may comprise a pressurised compartment located at a lower end of the turbine shaft.

Preferably the pressurised compartment may be fluidly sealed and/or house a generator unit. The pressurised compartment may house a gear box.

Preferably the pressurised compartment may fit within the receptacle of the support frame.

Preferably each turbine unit may be mounted into a receptacle by a quick connector. The quick connector may be operable by fluid pressure.

The system may comprise at least one flow deflector assembly operable to controllably adjust the flow into or out of the array of vertical axis turbines. Preferably the at least one flow deflector assembly may be operable to direct the fluid flow to a desired area in the turbine array.

The at least one flow deflector assembly may be operable to shut off the flow entering or leaving the array in response to a control signal from a control module.

The at least one flow deflector assembly may comprise a failsafe close mechanism, which may be operable to be actuated if the flow stream exceeds a velocity threshold.

Preferably the at least one flow deflector assembly may be a horizontally oriented flow deflector assembly. More preferably the at least one flow deflector assembly may be a vertically oriented flow deflector assembly.

The at least one flow deflector assembly may be configured to be operated in dependence on a control signal from a control module of the apparatus.

Preferably the control module may be configured to generate the control signal in dependence on acquired flow condition and/or operational data. The acquired flow condition and/or operational data may comprise data selected from one or more of: flow velocity; rotational speed; torque; vibration data; and energy output.

Preferably the acquired flow condition and/or operational data may comprise temperature data.

According to a second aspect of the invention, there is provided a method of assembling a system for the extraction of energy from an underwater flow stream in a body of water, the method comprising:
providing a support frame comprising a plurality of receptacles for mounting functional modules on the support frame, the plurality of receptacles arranged to form a horizontally-distributed two-dimensional array on the support frame;
mounting a plurality of vertical axis turbine units or a plurality of vertical axis turbine units and one or more functional modules in the receptacles;
wherein the plurality of vertical axis turbine units and/or plurality of functional modules is interchangeably mountable in the receptacles.

Embodiments of the second aspect of the invention may include one or more features of the first aspect of the invention or its embodiments, or vice versa.

According to a third aspect of the invention, there is provided a method of extracting energy from an underwater flow stream in a body of water, using the system according to the first aspect of the invention.

Embodiments of the third aspect of the invention may include one or more features of the first or second aspects of the invention or their embodiments, or vice versa.

According to a fourth aspect of the invention, there is provided a method of servicing an energy extraction system for an underwater flow stream in a body of water comprising:
providing the system according to the first aspect of the invention on the bed of a body of water;
accessing a receptacle on the support frame; and
releasing a vertical axis turbine unit or a functional module from the receptacle.

The method may comprise accessing the receptacle through a hatch positioned above the receptacles.

The method may comprise releasing a vertical axis turbine unit or a functional module from the receptacle manually or via a control module.

The method may comprise installing a vertical axis turbine unit or a functional module in the receptacle.

Embodiments of the fourth aspect of the invention may include one or more features of the first to third aspects of the invention or their embodiments, or vice versa.

According to a fifth aspect of the invention, there is provided a modular system for the extraction of energy from an underwater flow stream in a body of water, the system comprising:
a support frame comprising a plurality of receptacles for mounting functional modules on the support frame, the plurality of receptacles arranged to form a horizontally-distributed two-dimensional array on the support frame;
a plurality of vertical axis turbine units; and
a plurality of functional modules;
wherein the plurality of vertical axis turbine units and the plurality of functional modules are interchangeably mountable in the receptacles.

Embodiments of the fifth aspect of the invention may include one or more features of the first to fourth aspects of the invention or their embodiments, or vice versa.

According to a sixth aspect of the invention, there is provided apparatus for the extraction of energy from an underwater flow stream in a body of water, the apparatus comprising:
a support frame;
a plurality of vertical axis turbines mounted on the support frame;
and wherein the support frame and plurality of vertical axis turbines form an integrated assembly configured to be towed to an installation and/or lowered to the bed of the body of water;
and wherein the plurality of vertical axis turbines forms a horizontally distributed two-dimensional array on the support frame.

The plurality of vertical axis turbines may be arranged substantially in a horizontal plane. Alternatively, the plurality of vertical axis turbines may be arranged with a subset of the vertical axis turbines vertically offset with respect to others of the plurality of vertical axis turbines. A first subset of the plurality of vertical axis turbines may be arranged substantially in a first horizontal plane, a second subset of the plurality of vertical axis turbines may be arranged substantially in a second horizontal plane, offset from the first horizontal plane. The axial dimensions of the subset of vertically offset vertical axis turbines may be arranged to overlap with the axial dimensions of others of the vertical axis turbines; in other words, two offset subsets may intersect the same horizontal plane. Alternatively, offset turbines may be arranged with no axial overlap.

Preferably the apparatus comprises at least one flow deflector assembly operable to controllably adjust the flow into or out of the array of vertical axis turbines.

Embodiments of the sixth aspect of the invention may include one or more features of the first to fifth aspects of the invention or their embodiments, or vice versa.

According to a seventh aspect of the invention, there is provided a method of extracting energy from an underwater flow stream in a body of water using the apparatus according to the sixth aspect of the invention.

Embodiments of the seventh aspect of the invention may include one or more features of the first to sixth aspects of the invention or their embodiments, or vice versa.

According to an eighth aspect of the invention, there is provided a method of installing apparatus for the extraction of energy from an underwater flow stream in a body of water, the method comprising:
providing an apparatus comprising an integrated assembly having support frame and a plurality of vertical axis turbines mounted on the support frame in a two-dimensional array on the support frame;
lowering the integrated assembly configured to the bed of the body of water and locating the apparatus on the seabed such that the two dimensional array is substantially horizontally distributed in an underwater flow stream.

Embodiments of the eighth aspect of the invention may include one or more features of the first to seventh aspects of the invention or their embodiments, or vice versa.

According to a ninth aspect of the invention, there is provided apparatus for the extraction of energy from an underwater flow stream in a body of water, the apparatus comprising:
a support frame;
a plurality of vertical axis turbines mounted on the support frame;
wherein the plurality of vertical axis turbines forms a horizontally distributed two-dimensional array on the support frame;
and wherein the apparatus comprises at least one flow deflector assembly operable to controllably adjust the flow into or out of the array of vertical axis turbines.

The apparatus may comprise a plurality of flow deflector assemblies oriented across a plurality of sides of the support frame, and/or the at least one flow deflector assembly may be oriented substantially parallel to a side of the support frame.

At least one flow deflector assembly may be movable between a closed position and an open position, and may be movable to a number or range of intermediate positions between the closed position and the open position.

Preferably, the at least one flow deflector assembly is operated in dependence on a control signal from a control module of the apparatus. The control module may generate the control signal in dependence on acquired flow condition and/or operational data. The acquired flow condition and/or operational data may comprise data selected from one or more of: flow velocity; rotational speed; torque; vibration data; and energy output.

Preferably, the at least one flow deflector assembly comprises a plurality of deflector members. The plurality of deflector members may comprise deflector members oriented substantially parallel to a side of the support frame. The plurality of deflector members may comprise deflector members oriented substantially horizontally.

The plurality of deflector members may comprise deflector members operable to be moved independently of one another and/or may comprise deflector members operable to be moved in opposing senses.

Alternatively or in addition, the plurality of deflector members may comprise deflector members operable to be moved in the same sense.

Preferably, the plurality of deflector members have movable horizontal angular positions.

Alternatively or in addition, the at least one flow deflector assembly may be operable to direct the flow entering or leaving the array to a different vertical flow position.

Preferably, the at least one flow deflector assembly is operable to shut off the flow entering or leaving the array, and may be operable to shut off the flow entering or leaving the array in response to a control signal from the control module.

The at least one flow deflector assembly may comprise a failsafe close mechanism, which may be actuated if the flow stream exceeds a velocity threshold.

Preferably, the support frame and plurality of vertical axis turbines form an integrated assembly configured to be towed to an installation and/or lowered to the bed of the body of water. More preferably, the plurality of vertical axis turbines is arranged substantially in a horizontal plane.

The plurality of vertical axis turbines may be arranged with a subset of the vertical axis turbines vertically offset with respect to others of the plurality of vertical axis turbines.

The support frame may comprise a plurality of receptacles for mounting functional modules on the support frame, and/or the plurality of vertical axis turbine units may be configured to be interchangeably mounted in the receptacles.

Embodiments of the ninth aspect of the invention may include one or more features of the first to eighth aspects of the invention or their embodiments, or vice versa.

According to a tenth aspect of the invention, there is provided a method of extracting energy from an underwater flow stream in a body of water, the method comprising:
providing an apparatus comprising a support frame and a plurality of vertical axis turbines mounted on the support frame in a horizontally distributed two-dimensional array on the support frame;
operating at least one flow deflector assembly disposed on the apparatus to controllably adjust the flow into or out of the array of vertical axis turbines.

The method may comprise moving the at least one flow deflector assembly between a closed position and an open position, and may comprise moving the at least one flow deflector assembly to at least one of number or range of intermediate positions between the closed position and the open position.

The method may comprise operating the at least one flow deflector in dependence on a control signal from a control module of the apparatus, and may further comprise generating the control signal in dependence on acquired flow condition and/or operational data.

The acquired flow condition and/or operational data may comprise data selected from one or more of: flow velocity; rotational speed; torque; vibration data; and energy output.

The acquired flow condition and/or operational data may comprise temperature data.

Preferably, the at least one flow deflector assembly comprises a plurality of deflector members, and method may comprise operating the plurality of deflector members independently of one another.

The method may comprise moving the plurality of deflector members in opposing senses.

The method may comprise moving the horizontal angular position of the plurality of deflector members.

Preferably, the method comprises directing the flow entering or leaving the array to a different vertical flow position.

The method may comprise shutting off the flow entering or leaving the array, and may comprise shutting off the flow entering or leaving the array in response to a control signal from the control module. The method may comprise shutting off the flow entering or leaving the array by actuation of a failsafe close mechanism.

Embodiments of the tenth aspect of the invention may include one or more features of the first to ninth aspects of the invention or their embodiments, or vice versa.

BRIEF DESCRIPTION OF THE DRAWINGS

There will now be described, by way of example only, various embodiments of the invention with reference to the drawings, of which:

FIG. 6 is an enlarged isometric view of the apparatus 10 showing deflector assemblies in more detail.

DETAILED DESCRIPTION OF PREFERRED EMBODIMENTS

Figure 1A:
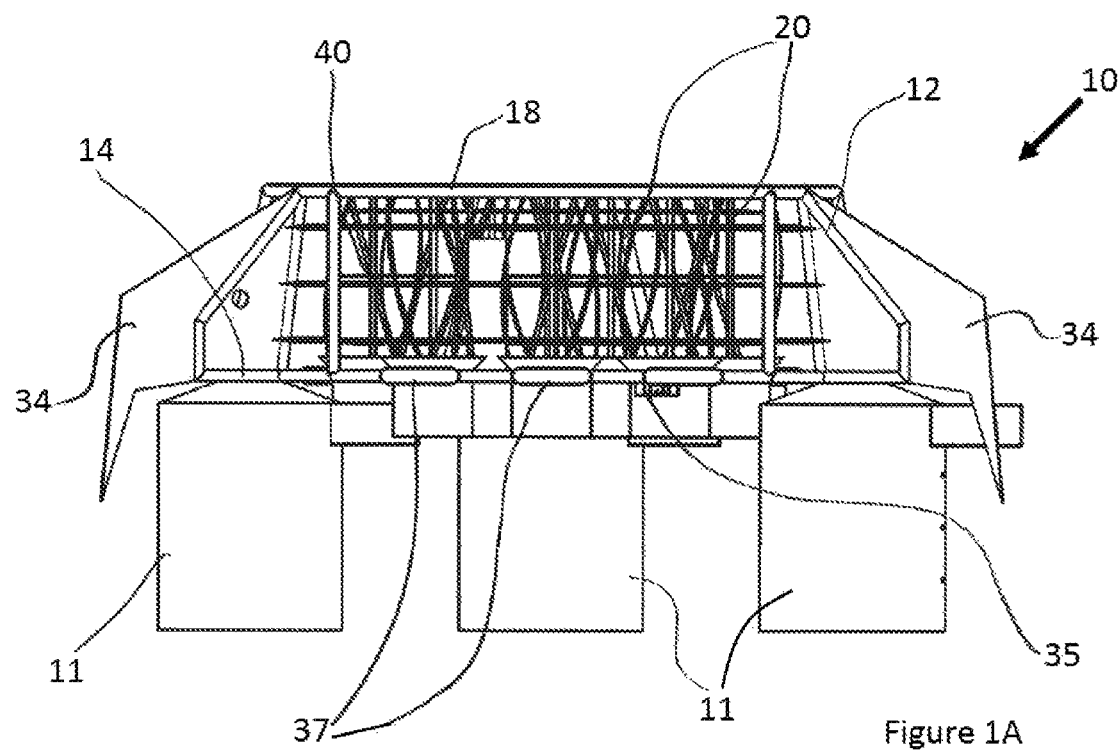
FIG. 1A is a side view of a tidal power generation apparatus according to an embodiment of the invention from a first elevation.
Figure 1B:
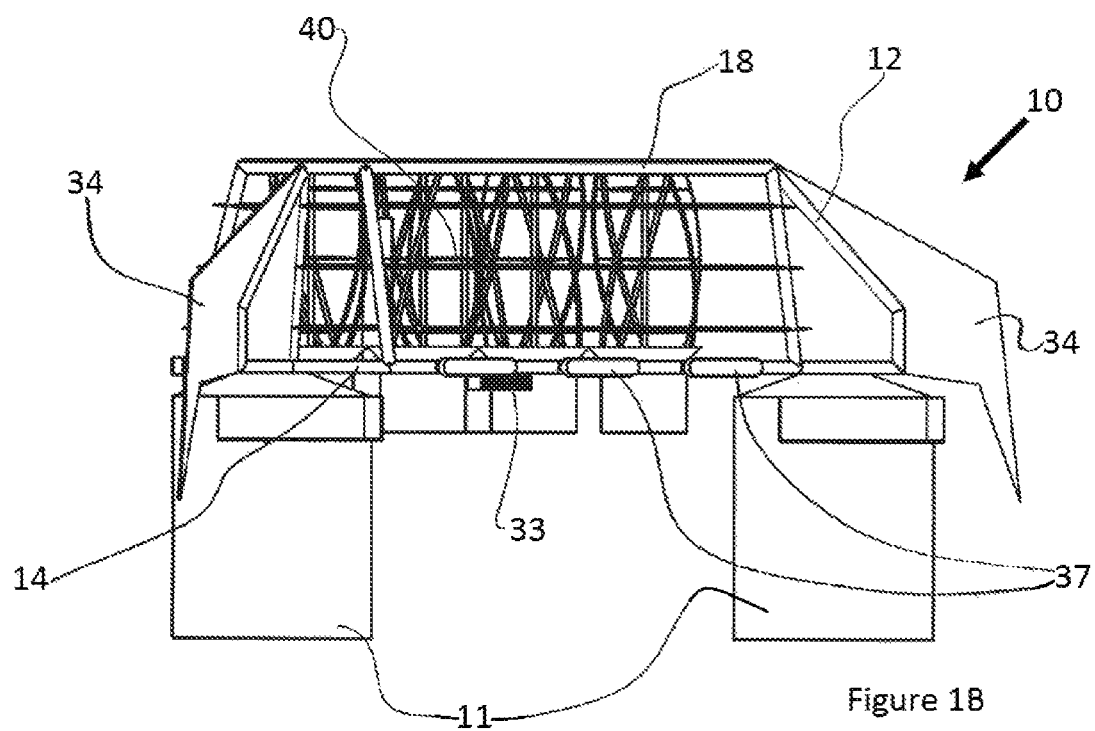
FIG. 1B is a side view of the tidal power generation apparatus of FIG. 1A from a second elevation.
Figure 1C:
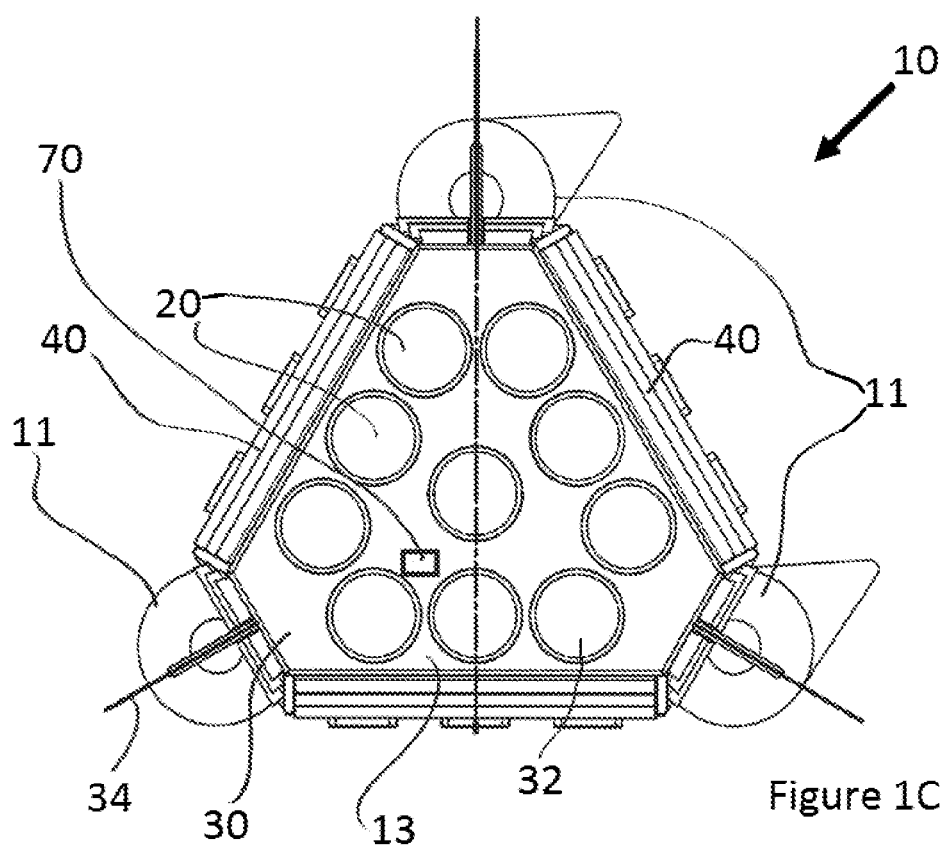
FIG. 1C is a top view of the tidal power generation apparatus of FIGS. 1A and 1B.
Figure 1D:
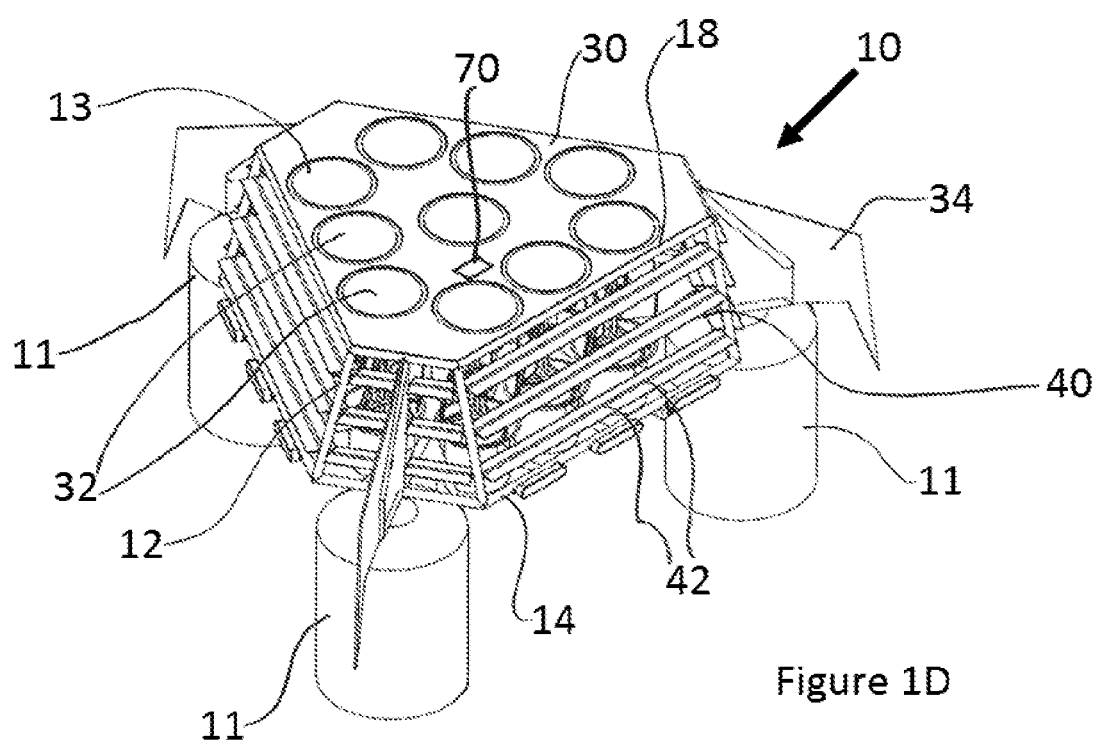
FIG. 1D is a perspective view of the tidal power generation apparatus of FIGS. 1A to 1C.
Figure 2:
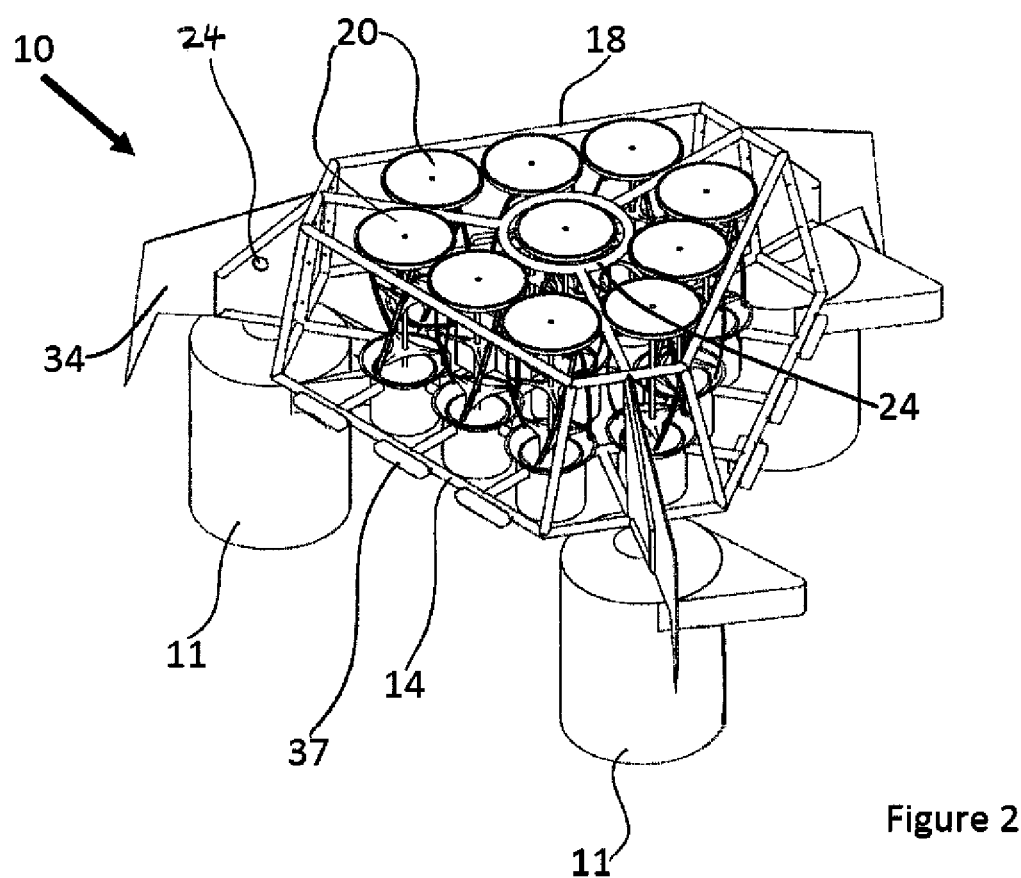
FIG. 2 is a perspective view of the tidal power generation apparatus of FIG. 1 with top plate and flow shutters omitted for clarity.

Referring firstly to FIGS. 1A, 1B, 1C, 1D and 2, there is represented a tidal power generation apparatus generally depicted at 10. FIGS. 1A to 1D show the apparatus 10 respectively from a first side elevation, a second side elevation, a plan view, and an isometric view. FIG. 2 is an isometric view of the apparatus 10 having a top plate and deflector assemblies omitted to improve clarity of other components.

The apparatus 10 is anchored to the seafloor by three suction cans 11, which are designed to secure the apparatus and provide the required resistance to the loads experienced by the system in operation (such as drag forces, hydrostatic and hydrodynamic forces). It will be appreciated that other foundation systems can be used without departing from the principles of the invention (alternatively or in combination with the suction cans), including for example piles, mudmats, seabed penetrating skirts, or gravity bases as are known in the art.

The three suction cans 11 provide support for a frame 12 upon which a two-dimensional array 13 of modular vertical turbine units 20 is mounted. The frame 12, as most clearly shown in FIG. 3, comprises a base frame 14 made of steel pipe segments bolted onto the suction cans 11 (although other fixing methods can also be used, such as welding or riveting). The base frame 14 has the general shape of an equilateral triangle with apexes truncated parallel to the opposing sides, and supports ten circular receptacles or hubs 16 upon which the modular vertical turbine units 20 are mounted. Adjacent to each side of the triangular-shaped base are three receptacles or hubs 16, and in the centre of the truncated triangular base there is one receptacle 16. The receptacles are interconnected by steel pipe segments welded to the receptacles. It will be appreciated that other base frame shapes, numbers or arrangements of receptacles and construction methods are feasible without departing from the principles of the invention.

Figure 3:
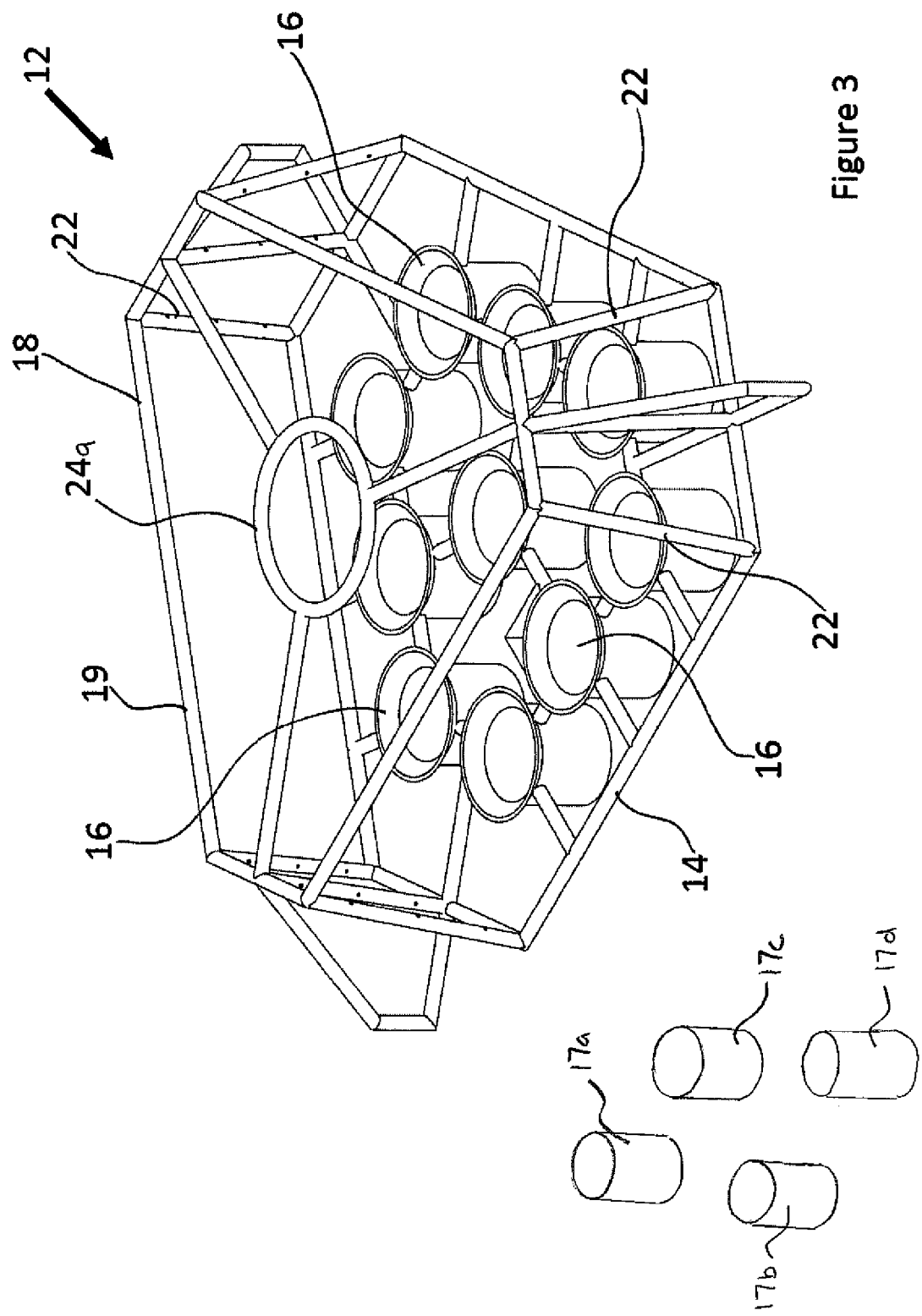
FIG. 3 is a perspective view of the base frame and protective frame of the tidal power generation apparatus of FIG. 1.

To improve the resistance of the apparatus 10 to trawler equipment (i.e. to facilitate making the apparatus over-trawlable), the frame 12 also comprises a protective frame 18, also made of welded steel pipe segments (as shown in FIG. 3), and welded to the perimeter of the base frame 14. The upper part 19 of the protective frame is substantially the same shape as and concentric with the base frame 14, but is smaller in size. Outer upright members 22 in the protective frame 18 are angled inwards in a direction upwards from the base frame to the upper part 19 of the protective frame. The upper part 19 of the protective frame 18 comprises a central ring 24a of steel pipe connected by steel pipe segments. In use therefore, the frame 12 comprises a support structure and protective surround for the two-dimensional array 13 of modular vertical turbine units 20.

The frame 12 also comprises support for substantially vertical planar flow deflectors 34 extending outwardly from each truncated corner and attached directly to the frame 12. The flow deflectors 34 serve to direct the incoming tidal flow towards the turbine array 13. The deflectors 34 have one spiked end pointing towards the seafloor, which penetrates the seafloor when the apparatus 10 is anchored to the seafloor. The upper edges of the deflectors 34 provide a surface over which trawling fishing gear can easily slide up and pass over the tidal power generation system 10 without damaging the turbines or becoming entangled with the system. Therefore, the tidal power generation system 10 can be located in fishing sea areas too and is compatible with the fishing industry. One of the deflectors 34 comprises a tow hole or tow point 24 in its reinforced portion 22.

In this example, three flow deflectors are provided but in alternative embodiments a lesser or greater number of flow deflectors may be provided. Other forms of flow deflectors may be used in alternative embodiments. For example, alternatives to the spikes maybe used depending on soil conditions, ease of penetration or potential for scouring. Further alternative embodiments of the invention may comprise pivoting mounts for the planar vertical flow deflectors 34, for example on the suction cans or other foundation points, which enable selective channelling of the flow stream towards a particular side of the array.

The apparatus 10 also comprises a top plate 30, which provides additional protection for the array of turbines against dropped objects and fishing equipment, and additional support for the turbines. The top plate 30 comprises a turbine hatch 32 located above each turbine which enables access to the vertical turbine units 20. Optionally. the top of the frame 18 is provided with an interface (not shown) for a tooling package to aid turbine installation, retrieval and maintenance.

Mounted on the outside of the frame 12 are horizontally oriented deflector assemblies 40, which comprise deflector members 42 substantially parallel to the perimeter of the base frame 14. The deflector members 42 are movable between closed and open configurations to enable the deflectors to modify the fluid flow entry into the apparatus as will be described below.

The apparatus 10 is rendered positively buoyant during towing of the apparatus to an offshore location. Buoyancy is provided by the hollow pipe segments that form the frame 12, and additional buoyancy is provided where required by floodable buoyancy chambers (not shown). Other detachable buoyancy elements could also be provided, such as syntactic foam floaters. Buoyancy of the apparatus feature permits an easier deployment of the tidal power generation system 10 in a single vessel trip to the deployment location, by a towing and sinking procedure, as is known in the art of subsea engineering. Significantly, the installation of the apparatus 10 may be performed without requiring a heavy-lift vessel.

Figure 4:
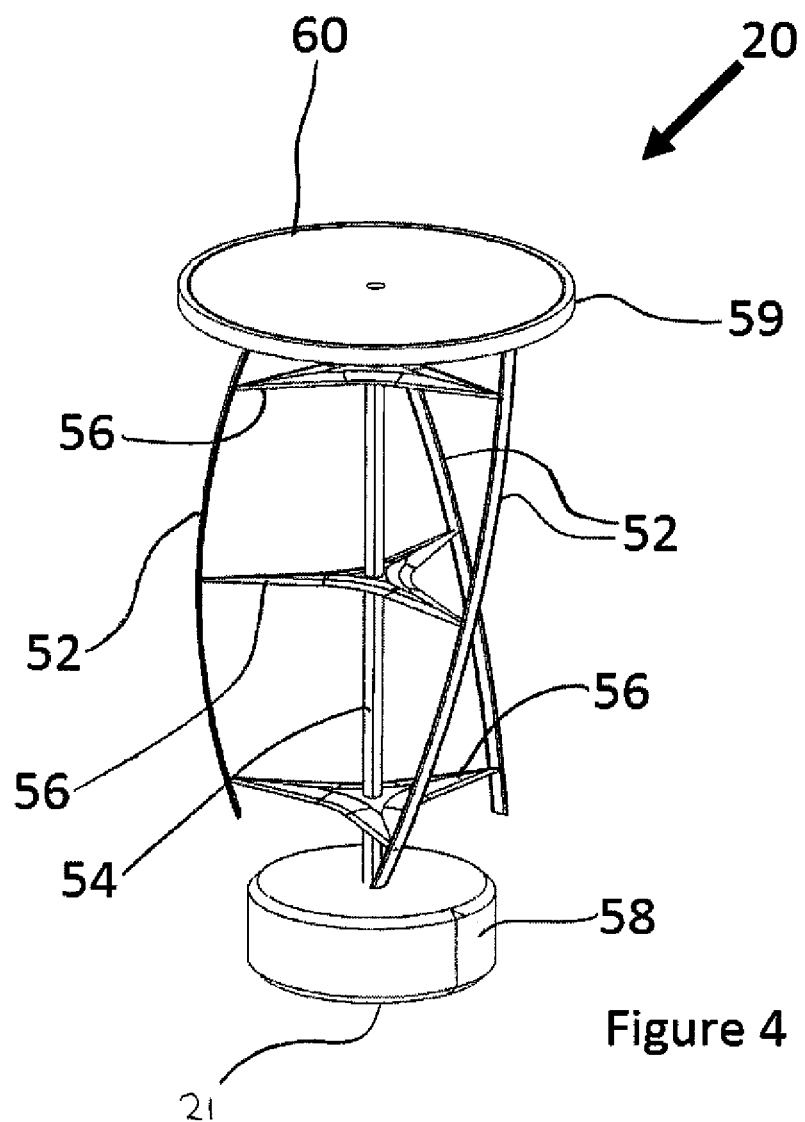
FIG. 4 is a perspective view of vertical axis turbine unit of the tidal power generation apparatus of FIG. 1.

FIG. 4 is an isometric view of a modular vertical turbine unit 20 as used in the apparatus of FIGS. 1 and 2. The turbine unit 20 of FIG. 4 is of the helical Darrieus type. The turbine unit of this embodiment has three vertically extending blades 52, each with an asymmetric hydrofoil profile, each having a helical twist of sixty degrees. The blades 52 are 120 degrees from one other. This blade configuration is selected to distribute the torque evenly over a whole turbine revolution, reducing the effects of pulsing. The blades 52 are connected to a turbine shaft 54 by three equally vertically spaced apart sets of radial arms 56. It will be appreciated that this is just one example of a turbine type that may be used with the invention.

At a lower end of the turbine shaft 54 is a pressurised compartment 58, fluidly sealed to avoid water ingress. The compartment 58 houses a gearbox and an electrical generator unit (not shown), coupled to the turbine shaft 54. Each turbine unit therefore comprises its own generator equipment and gearbox (where necessary).

The pressurised compartment is shaped and sized to fit within a receptacle 16 of the base frame 12 of the apparatus. Each receptacle therefore provides a turbine interface cell. The turbine units 20 are preferably standardised modules which can be fitted into any one of the receptacles 16, and therefore the units are modules which can be positioned in the frame interchangeably and according to system requirements.

Each turbine unit is mounted into a receptacle 16 of the base frame by a suitable quick connector 21 which enables fast and reliable attachment/detachment of the turbine to/from the base frame receptacles 16. Although mechanical connectors may be used in alternative embodiments, the quick connectors are preferably operable by fluid pressure. The quick connector comprises upper and lower connector assemblies secured to the turbine unit and receptacle respectively. The upper and lower connector assemblies are brought together, and when coupled, the connector assemblies define a fluid chamber disposed between the upper and lower connector assemblies. A fluid conduit system connected to the suction pump 33 (FIG. 1B) and valve-controlled flowline arrangement to each of the receptacles enables the controlled flow of fluid into and/or out of the fluid chamber, to reduce the pressure and load the connector system together. The suction pump 33 therefore provides a low pressure volume which secures the unit into a receptacle. Fluid can be pumped back into the fluid chamber between the upper and lower connector assemblies to release or eject the turbine unit 20 from the receptacle.

Figure 5:
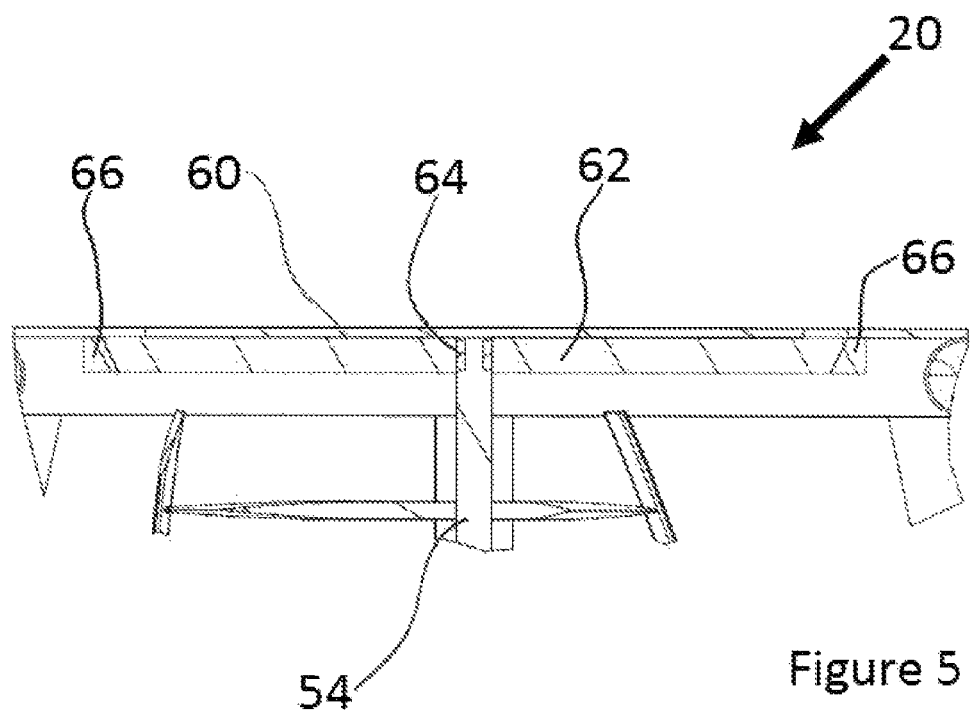
FIG. 5 is a sectional view of an upper bearing assembly of a turbine unit in accordance with the embodiment of FIG. 1.

At an upper end 59 of the turbine unit 20, the shaft 54 is connected to a circular bearing assembly 60, which is configured to be mounted into the frame 12 and top plate 30 of the apparatus. FIG. 5 is a sectional view through the bearing arrangement 60 in situ in the apparatus (showing elements of the upper part of the frame 18). The shaft 54 extends into a turbine top plate 62, and a bearing ring 64 is located between the shaft and the turbine top plate. The shaft 54 rotates with respect to the turbine top plate 62, which is fixed with respect to the frame 18 and top plate 30. A load ring 66 distributes the load of the turbine unit 20 through the apparatus.

With the turbine units 20 mounted in the receptacles 16, the compartments 58 are electrically connected by an electrical penetrator into a system of electrical conductors (not shown) in the apparatus 10. The electrical conductors are configured for the transfer of electrical energy from each unit to a common wet-mate connector, shown at 35 on FIG. 1A. The wet-mate connector 35 enables the apparatus to be connected to the electrical grid via a single umbilical (not shown) and an on-shore electrical sub-station.

Anodes 37 are provided on the apparatus 10 and form part of a corrosion protection system as is known in the art.

FIG. 6 is an isometric view of the apparatus 10 showing the features of the deflector assemblies 40 in more detail. Each deflector assembly 40 comprises deflector members 42 substantially parallel to the perimeter of the base frame 14 which are movable between closed and open configurations to enable the deflectors to modify the fluid flow entry into the apparatus. The deflector members 42 are pivotally mounted about pivots fixed to uprights 22 of the frame 12. Deflector assemblies 40a extend across substantially the whole the long sides of the frame, and deflector assemblies 40b are disposed in the short sides of the frame 12 between the uprights 22 and the deflectors 34.

Movement of the deflector members is controlled by electric servomotors operated from a control module on the apparatus 70. The position of the deflector members is optimised by the control module 70 according to the energy generation from the system in particular flow conditions. The control module 70 receives data from each of the modular vertical turbines, such as rotational speed and/or energy output, and adjusts the angular deflection of each deflector member in order to obtain an improved energy output.

Each deflector member 42 is capable of being adjusted independently of the others, and may be rotated in the same sense or the opposite sense as other deflectors in the same assembly. Opposing rotation may tend to cause convergence of the flow in a vertical direction, whereas in other flow conditions divergence or laminar deflection may be preferred.

By adjusting the horizontal angular position of the deflector assemblies, the vertical position of the inflow and outflow of the apparatus can be adjusted to direct the flow to the appropriate vertical position of the turbines for preferred operation of the system. The fluid flow can be directed to the turbines at a particular horizontal plane of attack. While in many cases this may be for optimum energy output, this need not be optimal for all turbine units in the system. The flow regime around the turbine units in the array is complex, and depending on the flow conditions, it may be preferable to reduce energy output from a particular turbine unit to generate more energy output from the array as a whole. There may also be other considerations which require control or restriction of the flow, for example, to keep the turbines operating below an upper operational threshold in high flow and/or flow demand conditions.

The deflector members are automatically positioned to direct the fluid flow to the desired area in the turbine array. The position of the shutters can also be controlled manually, without automatic control, for example in situations when the control module 70 is not operative.

The deflector member may also be closed completely to shut off flow into or out of the apparatus along one or more of the sides of the apparatus. Shutting off the flow may be desirable in high or turbulent flow conditions, for example to protect the apparatus. Moderating or reducing the fluid flow entering the turbine space may reduce or eliminate a requirement for turbine brakes. Instead of shutting of the flow completely, one or more of the deflector members may be partially closed to restrict or choke the flow through the apparatus. In one embodiment, the deflector assemblies are configured to have a passive failsafe close feature, which is actuated if the flow stream exceeds a velocity threshold. In extreme flow conditions, the flow deflectors are closed to shut-off the flow and protect the turbine array from damage.

Variations to the above-described deflector assemblies are within the scope of the invention. For example, although the apparatus 10 comprises horizontally oriented flow deflector assemblies, in alternative embodiments the apparatus may comprise one or more vertically oriented flow deflector assemblies, which operate according to the same principles as the horizontal deflector assemblies to direct the fluid flow to the desired area in the turbine array. Alternatively or in addition, the positioning of the deflector assemblies could be controlled by hydraulic or mechanical means, rather than the electrical servo motors described above. The shapes of the deflector members need not be straight and need not be regular; curved or other complex shapes may be used to form the deflector assemblies.

The provision of deflector assemblies enables the apparatus to be operable in a wider envelope of tidal stream speeds. For example, at low tidal stream speeds the shutters can be positioned so as to focus and increase the speed of tidal stream in a particular horizontal plane. When high tidal stream speeds occur, the flow deflectors can distribute the stream over the whole height of the apparatus and deflect some of the stream away from the turbine space, so that the turbines do not rotate above their operational parameters (thus eliminating the need for turbine braking). This increased operational flexibility allows the apparatus 10 to be situated in a wide range of locations, for example in rivers and estuaries, including those which are close to where the energy demand is greatest. By placing the apparatus in offshore locations close to the energy demand, the need for expensive and lengthy power umbilicals may also be reduced. The apparatus may also be functional in low speed tidal areas, where its deployment is likely to be operationally more straightforward (due to the favourable flow conditions) and more economical. The flow deflector assemblies also provide protection against debris in the flow stream when in their open condition (against objects larger than the spaces between the flow deflectors) or when closed (e.g. when it is known or though that there is a risk of debris damage).

Prior to use, the apparatus will be configured onshore or at an offshore facility by assembling the frame 12 with the foundation structure and the turbine units 20. The apparatus will be designed and assembled according to the requirements of the specific location in which it is to be deployed. Turbine units 20 will be installed in the receptacles 16 of the frame 12 prior to towing and deployment of the apparatus to the installation location, and the electrical penetrators will be connected to couple each turbine unit into the electrical transmission infrastructure of the apparatus. The turbine units 20 are interchangeable in the receptacles 16, and therefore the apparatus forms a modular system comprising the support structure and the turbine units.

The frame 12 of the apparatus 10 comprises ten receptacles, but it is not necessary for each receptacle to have a turbine unit installed in it. In some applications, one or more receptacles 16 may comprise modules 17a which perform energy storage function or contain some other type of subsea equipment. For example, an accumulator cell module 17b may be located in a receptacle of the apparatus instead of a turbine unit. The accumulator may be charged by energy generated by the turbine units of the apparatus, and may be used to provide a power source for nearby subsea equipment. Alternatively (or in addition) a receptacle may provide a mounting point for a hydrogen fuel cell 17c, which is driven by operation of the turbine units to store energy for subsequent use. Alternatively (or in addition) a receptacle may provide a mounting point for a subsea control module 17d.

Whatever function the modules perform, they are conveniently installed as interchangeable modules in the apparatus 10.

After assembly of the apparatus in the desired configuration, the apparatus is rendered positively or neutrally buoyant to enable it to be towed to an offshore location and lowered to a seabed location on which it is installed. With the apparatus secured to the seabed, the wet-mate connection of the subsea umbilical is made up to connect the apparatus to power transmission infrastructure. Alternatively, if it did not prevent successful deployment of the apparatus, the electrical connection could be fully made up at surface. In alternative configurations, a number of apparatus 10 may be connected together to "daisy chain" the apparatus 10 into a larger array.

In use, the deflector assemblies 40 of the apparatus are opened to expose the turbine units of the apparatus to the tidal flow stream and cause rotation of the turbines and extraction of energy from the flow stream. As noted above, the energy generated by the apparatus is monitored by the control module, and the positions of the deflector assemblies are manipulated by the servo motors to optimise the flow into and out of the apparatus. The modular nature and flexible configuration of the apparatus 10 means that in different applications the two-dimensional array of the apparatus may be configured differently (i.e. with turbine modules in different locations and energy storage modules in different locations in the array). The deflector assemblies 40 enable the flow to be optimised according to the specific flow conditions, and the specific configuration of the apparatus.

After a period of use it may be necessary to remove, replace or service a module from the apparatus 10. The configuration of the above-described embodiment facilitates access to the individual modules of the apparatus 10 via the hatches 32 positioned above the receptacles 16. A hatch 32 is opened by a diver or remotely operated vehicle (ROV), and the turbine unit (or other module) is released from the receptacle in which it is located manually or via the control module 70 (which may be activated by a remote signal received by the control module 70). The module to be removed can easily be extracted from the apparatus via the hatch, for example by lifting it using an ROV or cable from surface, or by attaching it to a controllable buoyancy apparatus to allow it to be recovered to surface. A module (e.g. a new or recently serviced turbine unit) may be installed in the apparatus 10 via the hatch 32. Advantageously, an individual module may be removed and/or installed in the apparatus without disrupting the installation or operation or other modules forming a part of the apparatus. Optionally, the deflector assemblies may be closed while removal and/or replacement is being completed, to isolate the operation from the surrounding tidal regime, increasing the operational envelope for completing the task.

The invention provides a system for the extraction of energy from an underwater flow stream in a body of water.

The system comprises a support frame which comprises a plurality of receptacles for mounting functional modules on the support frame. The plurality of receptacles are arranged to form a horizontally-distributed two-dimensional array on the support frame. The plurality of vertical axis turbine units is configured to be interchangeably mounted in the receptacles.

The invention also provides apparatus for the extraction of energy from an underwater flow stream in a body of water and a method of use. The apparatus comprises a support frame and a plurality of vertical axis turbines mounted on the support frame. The support frame and plurality of vertical axis turbines form an integrated assembly configured to be towed to an installation and/or lowered to the bed of the body of water, and the plurality of vertical axis turbines forms a horizontal two-dimensional array on the support frame. In a preferred embodiment, the apparatus comprises at least one flow deflector assembly operable to controllably adjust the flow into or out of the array of vertical axis turbines.

Various modifications to the above-described embodiments may be made within the scope of the invention, and the invention extends to combinations of features other than those expressly claimed herein.

The invention claimed is:

1. A system for the extraction of energy from an underwater flow stream in a body of water, the system comprising:
   a support frame configured to be located on the bed of the body of water and comprising a plurality of receptacles arranged to form a horizontally-distributed two-dimensional array having at least two rows on the support frame, wherein receptacles in an adjacent row are offset;
   a plurality of vertical axis turbine units;
   at least one functional module selected from the group consisting of energy storage modules, accumulator cell modules, hydrogen fuel cell modules, and/or control modules; and
   at least one flow deflector assembly operable to controllably adjust the flow into or out of the array and direct the fluid flow to a desired area in the array;
   wherein each receptacle is configured to interchangeably mount and secure one vertical axis turbine unit or one functional module to the support frame.

2. The system according to claim 1, wherein the plurality of vertical axis turbine units is arranged substantially in a horizontal plane.

3. The system according to claim 1, wherein the plurality of vertical axis turbines is arranged with a subset of the vertical axis turbines vertically offset with respect to others of the plurality of vertical axis turbines.

4. The system according to claim 1, wherein the support frame and plurality of vertical axis turbines units form an integrated assembly configured to be towed to an installation and/or lowered to the bed of the body of water.

5. The system according to claim 1, wherein each turbine unit comprises a turbine shaft and wherein a pressurised compartment is located at a lower end of the turbine shaft.

6. The system according to claim 5 wherein the pressurised compartment is fluidly sealed and houses a generator unit.

7. The system according to claim 6 wherein the pressurised compartment houses a gear box.

8. The system according to claim 6, wherein the pressurised compartment fits within the receptacle of the support frame.

9. The system according to claim 1, wherein each turbine unit is mounted into a receptacle by a quick connector.

10. The system according to claim 9, wherein the quick connector is operable by fluid pressure.

11. The system according to claim 7, wherein the at least one flow deflector assembly is operable to shut off the flow entering or leaving the array in response to a control signal from a control module.

12. The system according to claim 7, wherein the at least one flow deflector assembly comprises a failsafe close mechanism, which is operable to be actuated if the flow stream exceeds a velocity threshold.

13. The system according to claim 7, wherein the at least one flow deflector assembly is a horizontally oriented flow deflector assembly.

14. The system according to claim 7, wherein the at least one flow deflector assembly is a vertically oriented flow deflector assembly.

15. The system according to claim 7, wherein the at least one flow deflector assembly is configured to be operated in dependence on a control signal from a control module of the apparatus.

16. The system according to claim 15, wherein the control module is configured to generate the control signal in dependence on acquired flow condition and/or operational data.

17. The system according to claim 16, wherein the acquired flow condition and/or operational data comprises data selected from one or more of: flow velocity; rotational speed; torque; vibration data; and energy output.

18. The system according to claim 16, wherein the acquired flow condition and/or operational data comprises temperature data.

19. The system according to claim 1 wherein the receptacles are arranged in a triangular formation.

20. The system according to claim 1 wherein the receptacles are arranged in a delta formation.

21. The system according to claim 1, wherein the plurality of receptacles are interconnected by support segments, wherein each receptacle is configured to mount a vertical axis turbine unit or the functional module on the support frame to form an integrated assembly.

22. The system according to claim 1, wherein each receptacle is configured to mount a vertical axis turbine unit or the functional module on the support frame to form an integrated assembly.

23. The system according to claim 1, comprising suction cans to anchor the support frame to the bed of the body of water.

24. A method of assembling a system for the extraction of energy from an underwater flow stream in a body of water, the method comprising:
   providing a support frame configured to be located on the bed of the body of water and comprising a plurality of receptacles, wherein each receptacle is configured to interchangeably mount and secure one vertical axis turbine unit or one functional module to the support frame, wherein the functional module is selected from the group consisting of energy storage modules, accumulator cell modules, hydrogen fuel cell modules, and/or control modules, the plurality of receptacles arranged to form a horizontally-distributed two-dimensional array having at least two rows on the support frame, wherein receptacles in an adjacent row are offset;

providing at least one flow deflector assembly operable to controllably adjust the flow into or out of the array of vertical axis turbines and direct the fluid flow to a desired area in the array;

mounting a plurality of vertical axis turbine units or a plurality of vertical axis turbine units and a functional module in the receptacles.

25. The method according to claim 24, further comprising interconnecting the plurality of receptacles by support segments, wherein interconnecting the plurality of receptacles and mounting the plurality of vertical axis turbine units or a plurality of vertical axis turbine units and the functional module in the receptacles forms an integrated assembly.

26. A method of extracting energy from an underwater flow stream in a body of water, providing the system according to claim 1; and operating the at least one flow deflector assembly disposed on the apparatus to controllably adjust the flow into or out of the array of vertical axis turbines.

27. A method of servicing an energy extraction system for an underwater flow stream in a body of water comprising:

providing the system of claim 1 on the bed of a body of water;

accessing a receptacle on the support frame; and releasing a vertical axis turbine unit or the functional module from the receptacle.

28. The method according to claim 27 comprising accessing the receptacle through a hatch positioned above the receptacles.

29. The method according to claim 27 comprising releasing a vertical axis turbine unit or the functional module from the receptacle manually or via a control module.

30. The method according to claim 27 comprising installing a vertical axis turbine unit or the functional module in the receptacle.

31. A modular system for the extraction of energy from an underwater flow stream in a body of water, the system comprising:

a support frame configured to be located on the bed of the body of water and comprising a plurality of receptacles, wherein each receptacle is configured to interchangeably mount and secure one vertical axis turbine unit or one functional module to the support frame, wherein each of the one or more functional modules is selected from the group consisting of energy storage modules, accumulator cell modules, hydrogen fuel cell modules, and/or control modules, the plurality of receptacles arranged to form a horizontally-distributed two-dimensional array having at least two rows on the support frame, wherein receptacles in an adjacent row are offset;

at least one flow deflector assembly operable to controllably adjust the flow into or out of the array of vertical axis turbines and direct the fluid flow to a desired area in the array;

a plurality of vertical axis turbine units; and a plurality of functional modules.

32. The modular system according to claim 31, wherein the plurality of receptacles are interconnected by support segments, wherein each receptacle is configured to mount a vertical axis turbine unit or the functional module on the support frame to form an integrated assembly.

* * * * *